May 5, 1970     J. H. MERCIER     3,509,916
PRESSURE VESSEL

Filed Feb. 14, 1968     3 Sheets-Sheet 1

INVENTOR
JACQUES H. MERCIER

BY
ATTORNEY

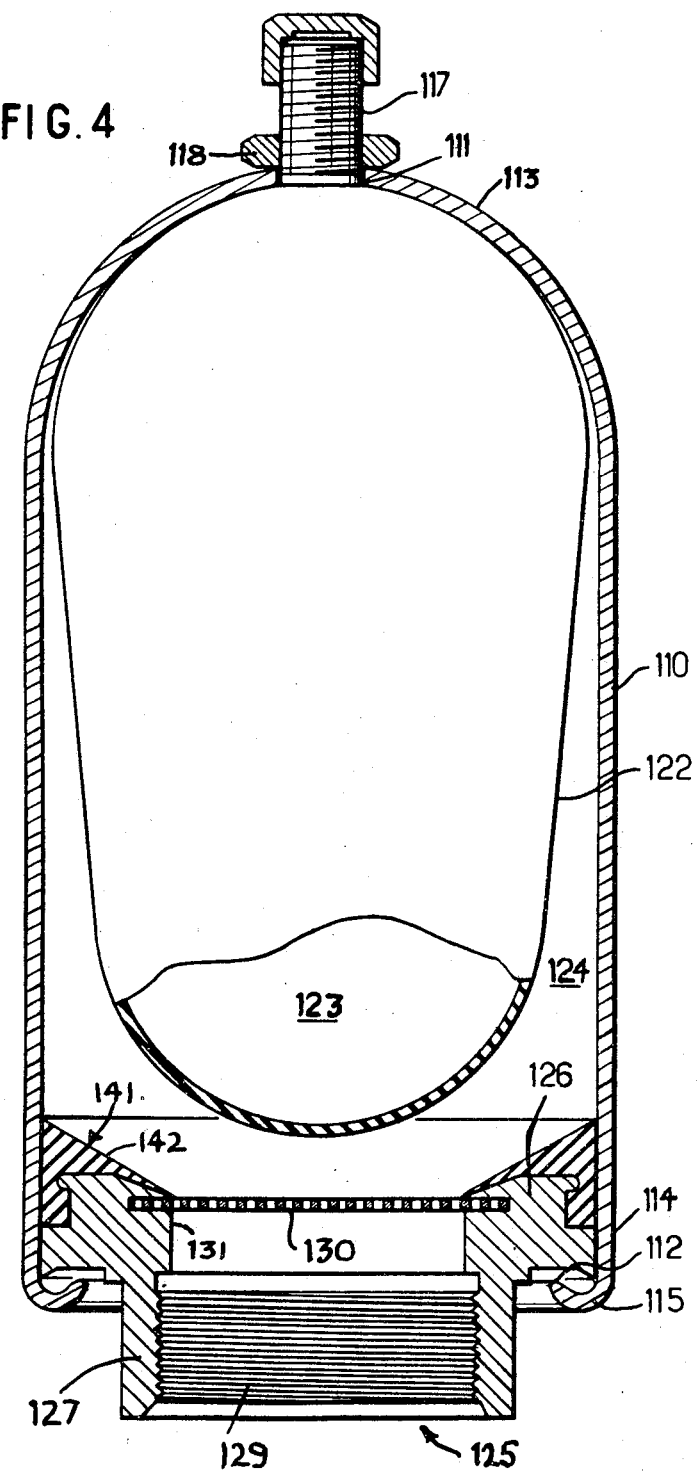

May 5, 1970 J. H. MERCIER 3,509,916
PRESSURE VESSEL
Filed Feb. 14, 1968 3 Sheets-Sheet 3
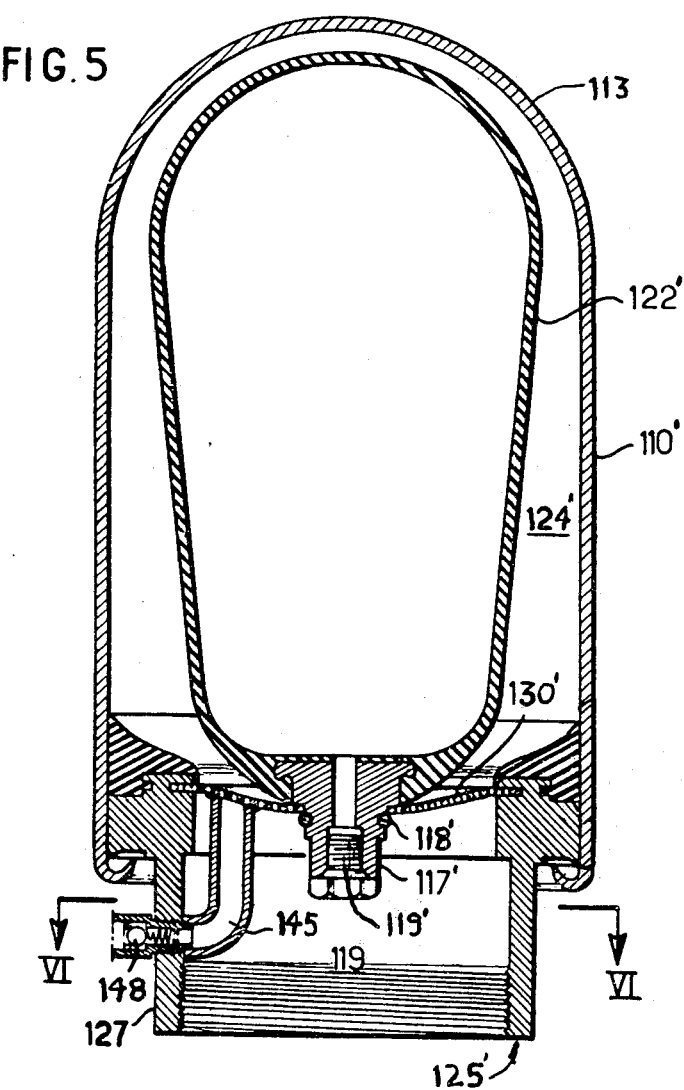
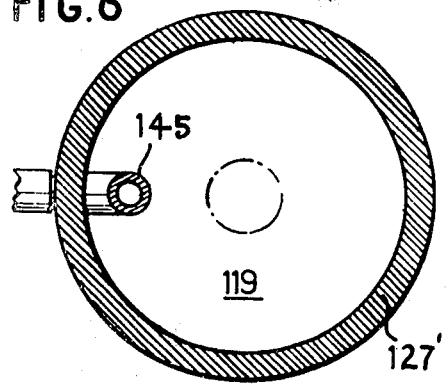
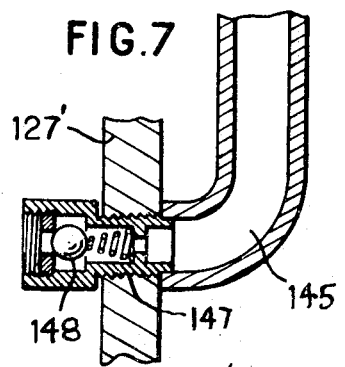
INVENTOR
JACQUES H. MERCIER
BY
ATTORNEY United States Patent Office 3,509,916
Patented May 5, 1970

3,509,916
PRESSURE VESSEL
Jacques H. Mercier, 1199 Park Ave.,
New York, N.Y. 10028
Filed Feb. 14, 1968, Ser. No. 705,471
Claims priority, application France, Feb. 24, 1967,
96,337
Int. Cl. F16i 55/04
U.S. Cl. 138—30    11 Claims

ABSTRACT OF THE DISCLOSURE

The invention relates to a pressure vessel comprising a container of rigid material having a cylindrical portion at one end with an inwardly extending annular flange, the junction between the flange and the cylindrical portion being curved and a closure plate in said container having a peripheral rim on its outer surface having a radius of curvature less than that of said junction so as to engage the curved portion of said junction at the root end of the flange to minimize the forces against the flange that would tend to move the latter outwardly.

---

As conducive to an understanding of the invention, it is noted that where it is desired to form a pressure vessel and particularly a pressure accumulator, that is relatively inexpensive in cost, the number of elements employed and the number of manufacturing steps must be kept to a minimum.

Where to provide such low cost pressure vessel, a rigid shell or container is provided having one end open with a closure plate positioned therein and retained in place by merely inwardly bending the free end of the shell or container, due to the pressure in the container which would exert force against the closure plate to move it outwardly, if such force is applied in manner to exert a high degree of leverage against the inwardly bent flange, the latter is likely to bend back to its original position causing leakage of oil from the container and even more important, permitting expulsion of the closure plate with possible injury to personnel and damage to equipment.

It is accordingly among the objects of the invention to provide a pressure vessel which may readily be formed with a minimum number of components and with relatively few operations and which will dependably retain a closure plate in position by the use of an inwardly bent flange against which the periphery of the closure plate abuts with assurance that a minimum force will be applied to such flange that would cause spreading thereof.

According to the invention the pressure vessel comprises a container of rigid material having a hemispherical portion at one end and an open mouth at the other with an inwardly extending annular flange, the junction between said cylindrical shell and the flange being curved. Positioned in the mouth of the container is an end closure assembly comprising a plate of diameter just slightly less than that of the cylindrical container so as to fit snugly therein. The outer surface of the plate has a peripheral rim having a radius of curvature less than that of said junction whereby the rim of the closure plate will engage the curved portion of said junction at the root end of said flange, thereby to minimize the forces against said flange that would tend to spread the latter outwardly.

Figure 1:
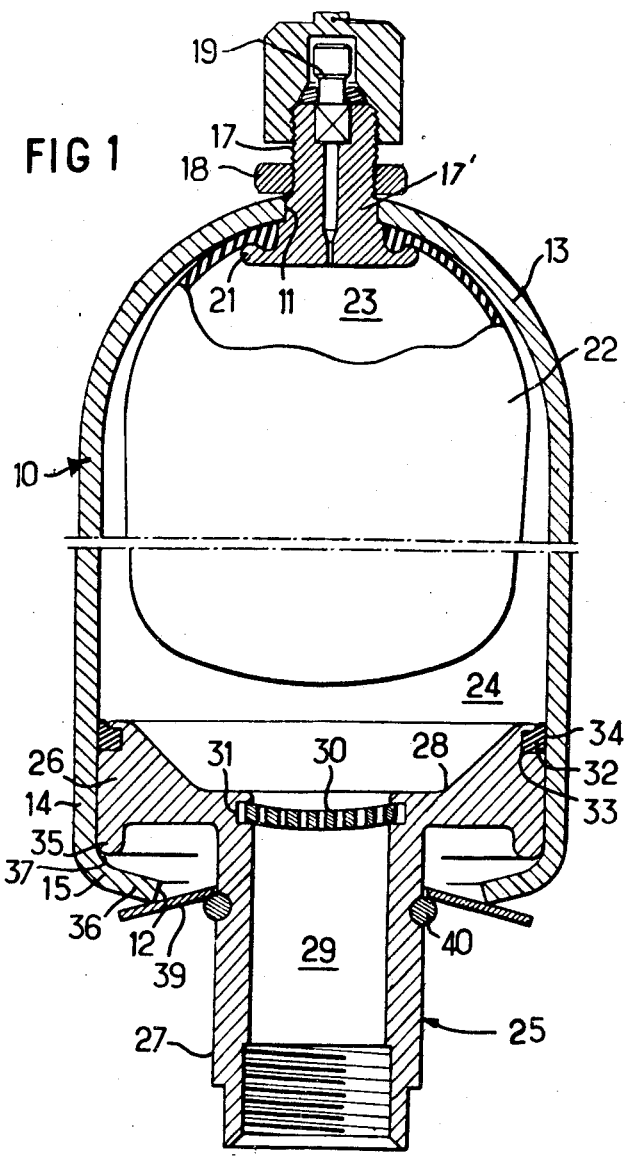
Figure 2:
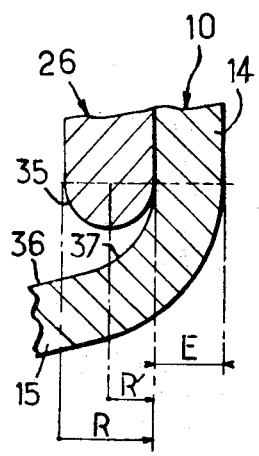
Figure 3:
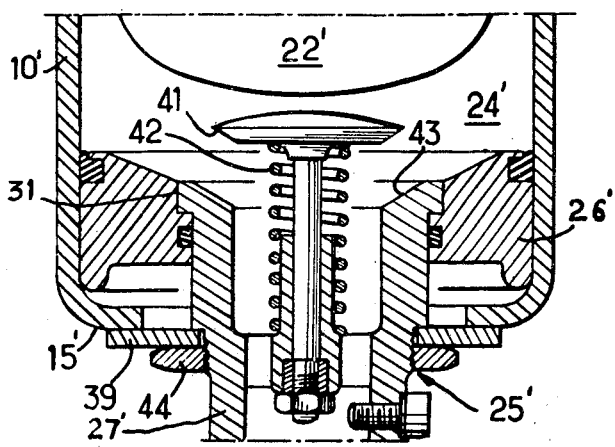

In the accompanying drawings in which are shown one or more of various possible embodiments of the several features of the invention, FIG. 1 is a longitudinal sectional view of a pressure vessel according to the invention, FIG. 2 is an enlarged detail view of a portion of the pressure vessel, FIG. 3 is a partial longitudinal sectional view of another embodiment of a pressure vessel according to the invention, FIG. 4 is a view similar to FIG. 1 of another embodiment of the invention.

FIG. 5 is a view similar to FIG. 1 of still another embodiment of the invention, FIG. 6 is a transverse sectional view taken along line V1—V1 of FIG. 5, and FIG. 7 is a detail view of an enlarged scale of the oil inlet port of the embodiment of FIG. 5.

Referring now to the drawings, as shown in FIG. 1, the pressure vessel 10, illustratively a pressure accumulator, comprises a container of rigid material such as steel or aluminum capable of withstanding the pressures to which the unit will be subjected in use.

The container 10 is substantially cylindrical along the major portion of the length as at 14, being hemispherical at one end as at 13 and having an open mouth 12 at its other end, axially aligned with an opening 11 in said end 13.

The mouth 12 is defined by inwardly bending the end of the cylindrical portion 14 of the container to form an annular flange 15, which tapers outwardly as at 36.

As shown in greater detail in FIG. 2, the junction between the cylindrical shell portion 14 and the flange 15 is curved as at 37 and such curved portion 37 has a section in an arc of a circle whose radius R along its inside face is equal to or greater than the thickness E of the wall of cylindrical portion 14.

Positioned in the container 10 is an outlet closure assmbly 25 which comprises a cylindrical plate 26 having an axial sleeve 27 extending outwardly therefrom.

The plate 26 is of diameter just slightly smaller than the inner diameter of the cylindrical portion 14 of the shell so as to fit snugly therein. The inner surface of plate 26 is formed with a bowl-shaped depression 28, the bottom of the bowl having an opening 31 aligned with the bore 29 of sleeve 27, the opening 31 having annular groove therein in which a perforated plate or screen 30 is force fitted.

The plate 26 on its inner face has an annular groove 33 formed in the periphery thereof in which an annular seal 32 is positioned, the seal having an outer face 34 that engages the inner surface of wall portion 14.

The plate 26 on its outer face has an annular groove defining a peripheral rim 35 which is of rounded section and designed to cooperate with the curved junction 37 between wall 14 and flange 15. Thus, the section of rim 35 is in the arc of a circle whose radius R' is much smaller than the radius R and the radius R is greater than the thickness of wall portion 14 as shown in FIG. 2.

Positioned in the container 10 is a deformable bladder 22 of elastic material. The mouth of the bladder is clamped against the inner surface of the container adjacent the periphery of port or opening 11 by the annular flange 21 of a fitting 17, the sleeve portion 17' of which extends through opening 11 and is encompassed by a nut 18 securely to retain the fitting in position.

The bladder divides the container into two chambers, i.e., chamber 23 which is filled with gas through a valve 19 secured in the outer end of fitting 17 and chamber 24 which is filled with a liquid such as oil through bore 29 of sleeve 27.

To assemble the pressure vessel above described, before the outlet closure assembly 25 is positioned in the container, the bladder 22 is secured in fixed position in the container with respect to port 11.

The closure assembly is then forced into the open end of the container and the free end thereof is then bent inwardly as shown in FIGS. 1 and 2 to form the annular flange 15.

To prevent inward movement of the closure assembly into the container when the accumulator is not under pressure, a washer 39 is provided encompassing sleeve 27, and which is retained between the periphery of flange 15 and a snap ring 40 positioned in an associated annular groove in the sleeve 27.

In normal operation of the pressure vessel, the bladder 22 is first charged with gas under pressure through valve 19. A fluid such as oil under pressure greater than the pressure in bladder 22 is then introduced through bore 29 into chamber 24 to compress the charged bladder. Thereupon, a valve (not shown) controlling bore 29 is closed and the accumulator is ready for use in conventional manner.

Due to the pressure on the fluid in chamber 24, the plate 26 will be forced outward, but will be restrained by the abutment of the curved rim 35 thereof against the rounded junction 37. Due to the fact that the radius of rim 35 is much smaller than the radius of junction 37, the outer surface of rim 35 will become wedged in position at the root end of the flange 15 so that the leverage effect and hence the force exerted against flange 15 will be at a minimum to prevent outward movement or spreading of flange 15.

The embodiment shown in FIG. 3 is similar to that shown in FIGS. 1 and 2 and corresponding parts have the same reference numerals primed.

Thus, as shown in FIG. 3, the plate 26' of the outlet closure assembly 25' has a central opening 31' in which the inner end of a sleeve 27' is positioned. The sleeve slidably mounts a poppet valve 41 which is normally retained spaced from its seat 43 by a coil spring 42. The valve 41 closes under the influence of the bladder 22' when the latter expands to force oil from the chamber 24' and opens when oil is forced into the chamber 24'.

Inward movement of the closure assembly 25' into the container 10' is restrained by means of a washer 39' reacting against the outer periphery of flange 15' and retained in position by a nut 44 screwed on sleeve 27'.

The embodiment shown in FIG. 4 is similar in many respects to the embodiment of FIG. 1. Thus, a bladder 122 is secured in the container 110 by means of an air air valve fitting 117 extending through port 111 in the hemispherical end 113 of the container and held in place by a nut 118.

The mouth 112 of the container is formed by inwardly bending the end of the cylindrical portion 114 of the container to form an annular flange 115. As is shown in FIG. 4, the radius of curvature of the junction 137 between cylindrical wall portion 114 and flange 115 is greater than that of the peripheral rim 135 of plate 126 of closure assembly 125.

In fact, in the embodiment of FIG. 4, the peripheral rim 135 is substantially triangular having its vertex forming an acute angle. Hence, when the chamber 123 of the pressure vessel, i.e., the interior of the bladder 122 is charged with gas under pressure, thereby exerting pressure against the oil charged into chamber 124 through the bore 129 of sleeve 127 of closure assembly 125, the plate 126 will be forced outwardly so that the rim 135 will abut against the root end of the flange 115 which will tend to flatten the rim 135 and wedge the latter to retain the plate 126 in position with little bending stress applied to flange 115.

As shown, the closure assembly 125 has a perforated plate or screen 130 extending across the bore 129 thereof. The screen may be secured in position at the time the closure assembly is molded or it may be retained in place in any other suitable manner.

The plate 126 has an annular packing member 141 secured to its periphery on its inner surface to provide a seal between the plate 126 and the wall of the container. The inner surface 142 of the packing is desirably beveled and inclined downwardly from the wall of the container to the periphery of opening 131 in the plate across which the screen 130 extends to receive the closed end of bladder 122 when the latter expands in use.

The accumulator shown in FIG. 4 is used in the same manner as the accumulator of FIG. 1. Thus, the bladder 122 is charged with gas under pressure through fitting 117. Oil under a greater pressure is then forced through a valve (not shown) controlling bore 129 into chamber 124 to compress the gas in bladder 122. The valve (not shown) is then closed and the accumulator is then available for use as a source of hydraulic power; as a shock absorber or the like.

In the embodiment shown in FIG. 5, parts corresponding to those of the embodiment of FIG. 4 have the same reference numerals primed.

Thus, the end closure assembly 125' of FIG. 5 is substantially identical to that of FIG. 4 and the container 110' is also substantially identical except that it has no port at its hemispherical end 113'.

As shown in FIG. 5, the bladder 122' has its closed end adjacent the hemispherical end 113' of container 110' and has a fitting 117' secured in its mouth which extends through an axial opening in screen 130' being secured in position as by a snap ring 118' encompassing the fitting 117'.

Thus the valve 119' controlling the gas inlet port of the bladder is only accessible through the bore 119 of the end closure assembly 125' and in use, this is connected through a threaded pipe or conduit to the utilization circuit.

To charge the chamber 124' defined between the bladder 122' and the container wall, a duct 145 is provided having one end connected to the screen 130' and its other end connected to the inner end of a fitting 146 extending through an opening 147 in the wall of sleeve 127'.

The fitting 146 mounts a one-way valve 148 which will permit flow of oil into the duct 145 and hence into the chamber 124', but restrain flow in reverse direction.

It is to be noted that the gas inlet port in fitting 117' is inaccessible to the user, which prevents inadvertent bleeding of gas from the bladder 122'. The bladder 122' and its point of connection to the fitting 117' are pressure balanced which insures long wear and prevents leakage.

Furthermore, the only connection to the exterior are liquid connections which are relatively easy to seal with dependability.

Having thus described my invention, what I claim as new and desire to secure by Letters Patent of the United States is:

1. A pressure vessel comprising a container of rigid material having a cylindrical portion at one end with an inwardly extending annular flange, the junction between said cylindrical portion and said flange being curved, a closure plate in said container having a peripheral rim on its outer surface having a radius of curvature less than that of said junction whereby the outer portion of the rim of the closure plate will engage the curved portion of such junction at the root end of said flange thereby minimizing the forces against said flange that would tend to move the latter outwardly, said container having a deformable bladder therein defining a gas chamber and an oil chamber on opposed sides thereof, and passage means leading into each of said chambers.

2. The combination set forth in claim 1 in which the radius of curvature of said junction is no less than the thickness of the cylindrical portion of the container wall adjacent said junction.

3. The combination set forth in claim 1 in which the radius of curvature of said rim is substantially zero, said rim being substantially triangular in cross section having its vertex engaging the curved portion of said junction at the root end of said flange.

4. The combination set forth in claim 1 in which said closure plate has a peripheral annular groove adjacent its inner surface, and an annular sealing member is positioned in said annular groove and engages the inner surface of said container.

5. The combination set forth in claim 1 in which said closure plate has an axial sleeve extending outwardly therefrom, said sleeve having an axial bore in communication at its inner end with the oil chamber, a washer encompassing said sleeve and having its outer periphery against the periphery of said annular flange and means encompassing said sleeve and secured thereto to retain said washer in position.

6. The combination set forth in claim 5 in which a screen extends transversely across the inner end of the bore of said sleeve to prevent extrusion of the bladder through said bore.

7. The combination set forth in claim 5 in which a valve member is provided movable axially with respect to the bore of said sleeve, the inner end of said sleeve defining a valve seat for said vavle member and resilient means normally urging said valve member away from said seat.

8. The combination set forth in claim 1 in which said closure plate has a peripheral annular groove adjacent its inner surface and an annular sealing member is positioned in said annular groove and engages the inner surface of said container, said annular sealing member having an annular beveled surface extending inwardly and downwardly from the container wall to receive the closed end of the bladder on expansion thereof.

9. The combination set forth in claim 1 in which said closure plate has a sleeve portion extending outwardly therefrom, said sleeve portion having an axial bore extending therethrough and through said closure plate, a screen extending transversely across the bore of said sleeve adjacent the inner end thereof, said closure plate having a peripheral annular groove adjacent its inner surface, an annular sealing member positioned in said annular groove and engaging the inner surface of said container, said sealing member having an annular beveled surface extending inwardly and downwardly from the wall of said container to said screen to receive the closed end of said bladder upon expansion thereof.

10. The combination set forth in claim 9 in which said bladder is closed at one end and has a mouth at its opposed end, a fitting secured in the mouth of said bladder, said fitting having a gas valve therein, means securing said fitting to said screen so as to extend axially thereof with the bladder positioned in the container on the inner side of said screen and with the air valve accessible on the outer side of said screen and a conduit in communication at one end with said screen and leading to the exterior of said unit for charging of said oil chamber.

11. The combination set forth in claim 10 in which said closure plate has an axial sleeve extending outwardly thereof, said air valve being positioned inwardly of the outer end of said sleeve, said conduit extends through the wall of said sleeve and a one-way valve is provided in the outer end of said conduit to permit flow of fluid in direction only through said conduit into said oil chamber.

References Cited

UNITED STATES PATENTS 608,349   8/1898   Sterne _____ 29—511

HOUSTON S. BELL, Jr., Primary Examiner

U.S. Cl. X.R.

29—511; 220—67, 85